(12) United States Patent
Cicilloni et al.

(10) Patent No.: US 7,570,156 B2
(45) Date of Patent: Aug. 4, 2009

(54) MOTOR VEHICLE SIGNALLING SYSTEM INCORPORATING A HAPTIC ACCELERATOR PEDAL

(75) Inventors: Renzo Cicilloni, Orbassano (IT); Patrizio Turco, Orbassano (IT); Alessandro Gallione, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 288 days.

(21) Appl. No.: 11/550,135

(22) Filed: Oct. 17, 2006

(65) Prior Publication Data

US 2007/0085667 A1    Apr. 19, 2007

(30) Foreign Application Priority Data

Oct. 19, 2005    (EP)    ................... 05425733

(51) Int. Cl.
| | |
|---|---|
| *B60Q 1/00* | (2006.01) |
| *G05D 1/00* | (2006.01) |
| *G06G 7/78* | (2006.01) |
| *G08G 1/16* | (2006.01) |
| *F41G 9/00* | (2006.01) |

(52) U.S. Cl. ................. 340/435; 340/436; 340/437; 340/438; 340/439; 701/1; 701/36; 701/300; 701/301; 701/302

(58) Field of Classification Search ......... 340/435–439; 701/1, 36, 300–302
See application file for complete search history.

(56) References Cited

U.S. PATENT DOCUMENTS 6,006,144 A * 12/1999 Takahashi et al. .............. 701/1

| 6,906,619 B2* | 6/2005 | Williams et al. ......... 340/425.5 |
|---|---|---|
| 7,006,917 B2* | 2/2006 | Hijikata ..................... 701/301 |
| 7,245,231 B2* | 7/2007 | Kiefer et al. ................ 340/903 |
| 2007/0001830 A1* | 1/2007 | Dagci et al. ................ 340/438 |
| 2007/0061066 A1* | 3/2007 | Bruelle-Drews ........... 701/200 |

FOREIGN PATENT DOCUMENTS

| DE | 25 55 429 | | 6/1977 |
|---|---|---|---|
| DE | 199 16 434 | A1 | 10/2000 |
| DE | 100 26 048 | A1 | 12/2001 |
| EP | 0617674 | B | 7/1993 |
| EP | 0 962 351 | A1 | 12/1999 |
| EP | 1 493 606 | A1 | 1/2005 |

* cited by examiner

*Primary Examiner*—Benjamin C Lee
*Assistant Examiner*—Lam P Pham
(74) *Attorney, Agent, or Firm*—Sughrue Mion, PLLC

(57) ABSTRACT

The system comprises:
  a signaling device able to provide the driver with a sensorial alarm signal indicating a danger situation;
  detectors able to provide signals and/or data representing the situation outside the motor vehicle and/or the travel conditions of the vehicle itself; and
  electronic processing and control devices designed to analyze the signals and/or data provided by the detectors and determine the occurrence of predetermined operating situations, such as the presence of any obstacles along the travel path of the motor vehicle, and generate, under predetermined conditions and in accordance with a predefined procedure, warning signals and/or data which can be used for activating the signaling device.

The signaling device comprises an electrically operated actuator associated with the accelerator pedal of the motor vehicle and able, when activated, to apply to said pedal a stress with predefined characteristics, which is perceivable by the driver's foot.

4 Claims, 3 Drawing Sheets

MOTOR VEHICLE SIGNALLING SYSTEM INCORPORATING A HAPTIC ACCELERATOR PEDAL

BACKGROUND OF THE INVENTION

The present invention relates to a motor vehicle signalling system.

More specifically the invention relates to a system for signalling to the user operating conditions of a motor vehicle provided with an accelerator pedal, for example for providing an anti-collision alarm signal, the system comprising:
- signalling means able to provide the driver with a sensorial alarm signal indicating a danger situation;
- detector means able to provide signals and/or data representing the situation outside the motor vehicle and/or travel conditions of the vehicle itself; and
- electronic processing and control means designed to analyse the signals and/or data provided by the detector means and determine the occurrence of predetermined operating situations, such as the presence of any obstacles along the travel path of the motor vehicle, and generate, under predetermined conditions and in accordance with a predefined procedure, warning signals and/or data which can be used for activating the signalling means.

SUMMARY OF THE INVENTION

One object of the present invention is to provide a signalling system able to warn in an effective manner the driver about an imminent danger condition, without however distracting him/her from the primary task being performed, namely that of driving.

These and other objects are achieved according to the invention by a system of the type indicated above, having the features defined in the annexed claims.

In the system according to the invention the signalling of a warning or alarm condition is therefore performed by means of a retroactive force applied to the accelerator pedal, which may therefore be defined as "haptic".

The system according to the invention may be used in order to signal various operating conditions, such as a speed limit which is exceeded, etc.

BRIEF DESCRIPTION OF THE DRAWINGS

Further characteristic features and advantages of the invention will emerge from the detailed description which follows, provided purely by way of a non-limiting example, with reference to the accompanying drawings in which.

DETAILED DESCRIPTION OF THE PREFERRED EMBODIMENTS OF THE INVENTION

In the example of embodiment which will be described now, the system according to the invention is intended to generate an anti-collision alarm signal. This example is intended to provide a non-limiting explanation, the system being able to be easily modified in order to signal other operating situations or conditions.

Figure 1:
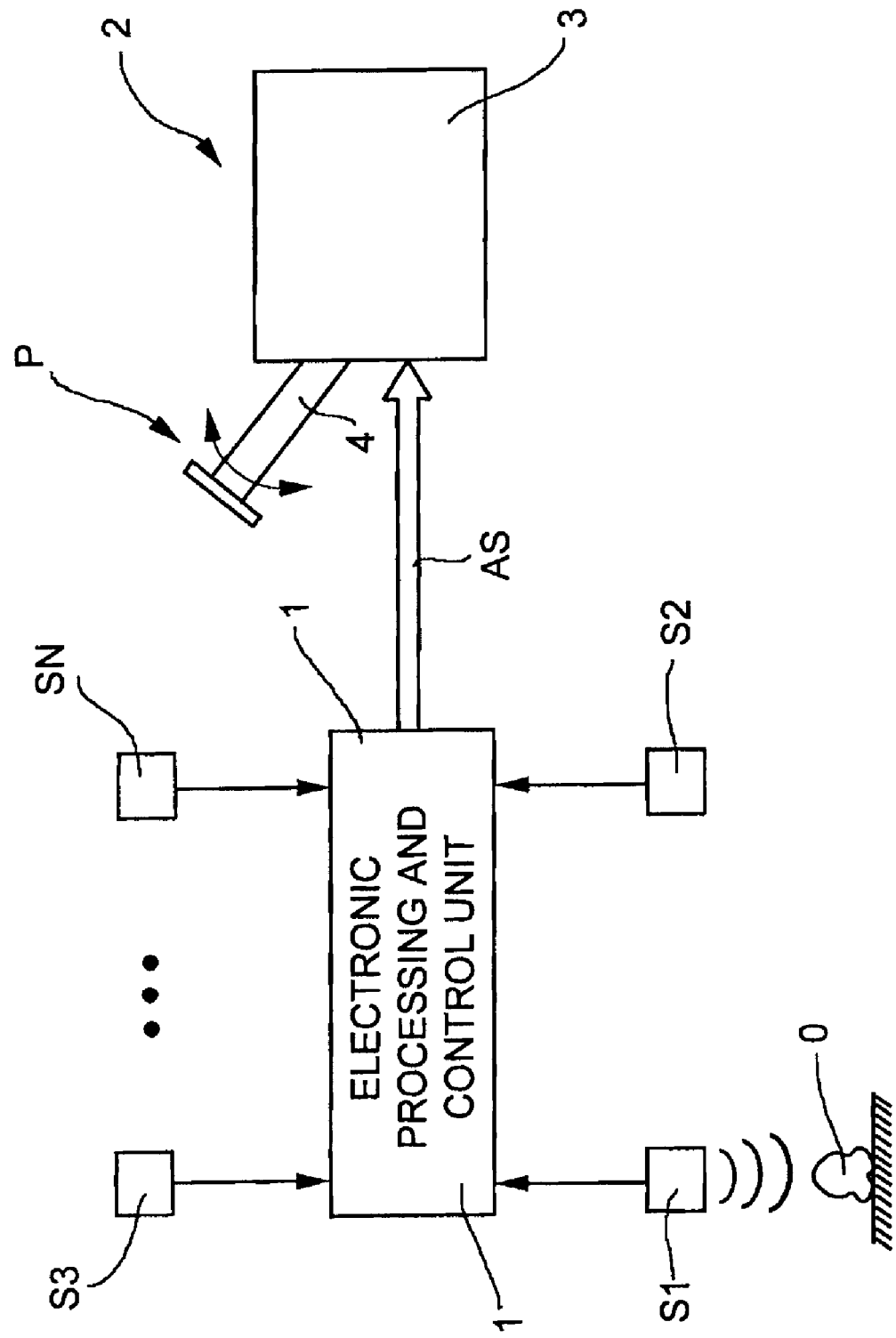
FIG. 1 is an illustration, in the form of a block diagram, of a signalling system according to the present invention.

With reference to FIG. 1, an anti-collision alarm signalling system for a motor vehicle according to the invention comprises an electronic control unit 1 to which a plurality of sensor or detector devices S1, S2, . . . , SN are connected. These devices provide the control unit 1 with signals and/or data representing the situation outside the motor vehicle (not shown) and travel conditions of the latter. Thus, for example, the detector device S1 may be a Doppler radar able to detect the presence of an obstacle O situated in front of the vehicle, along the travel path of the latter. The signals provided by this radar allow the unit 1 to deduce the distance of the obstacle O from the motor vehicle and the relative speed of the motor vehicle with respect to this obstacle.

The detector device S2 is, for example, a sensor for the travel speed of the motor vehicle; the detector device S3 is, for example, a detector for the steering angle of the motor vehicle, etc..

The control unit 1 is designed to generate, under predetermined conditions and in accordance with a predefined procedure, warning signals and/or data AS which can be used for activating an alarm signalling device, denoted overall by 2.

According to the present invention, the signalling device 2 comprises the normal accelerator pedal P of the motor vehicle with which an electromechanical system 3 is associated, said system being able to apply to the pedal a stress (retroactive force) with predetermined characteristics, which can be perceived by the driver with his/her foot acting on the pedal P.

Figure 2:
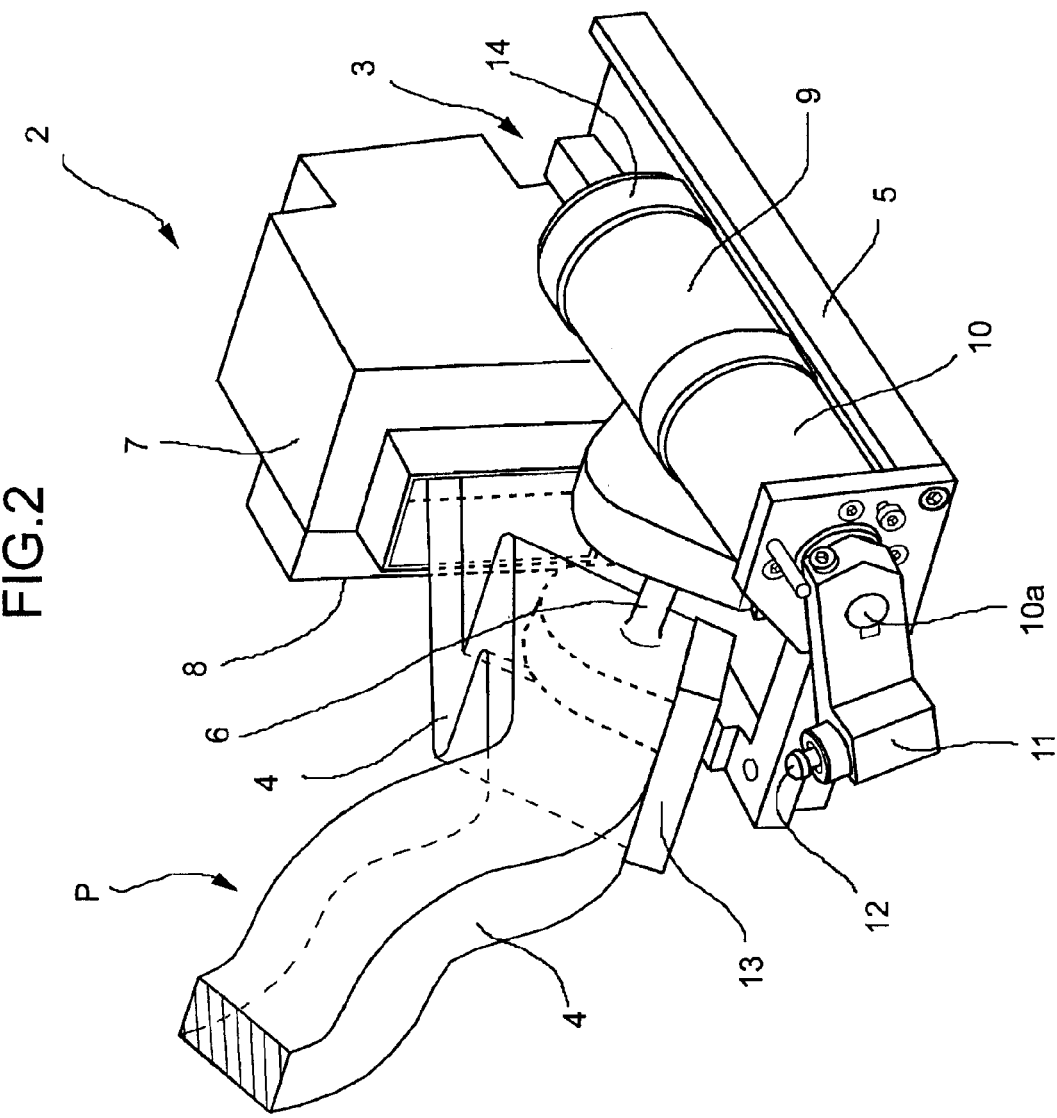
FIG. 2 is a partial perspective view of an accelerator pedal and associated devices for use in a system according to the invention.

With reference to FIG. 2, the accelerator pedal P in a manner known per se comprises a lever 4 mounted pivotably about a pin 6 with respect to an operationally stationary support structure 5. An arm of the lever 4 extends inside a structure 7 having, associated with it in a manner known per se, an electric position sensor 8, for example a sliding contact potentiometer, able to provide electric signals indicating the instantaneous angular position of the pedal P.

The electromechanical system 3 associated with the accelerator pedal P in the embodiment shown comprises an electric motor 9, such as a direct-current motor, and an associated speed reducer 10 (FIG. 2). The motor 9 and the reducer 10 are fixed to the support structure 5 adjacent to the accelerator pedal P.

A transverse arm 11 is fixed to the output shaft 10a of the speed reducer 10 and extends underneath and in a spaced relationship with respect to the lever 4 of the accelerator pedal P. The distal end of the arm 11 has in particular a push-piece 12 intended to engage with a mounting plate 13 applied underneath the lever 4 of the pedal P.

An angular position sensor (for example a rotating encoder) 14 may be associated with the electric motor 9 (see FIGS. 2 and 3), said sensor, during operation, being able to provide signals or data indicating the instantaneous angular position of the output shaft 10a of the gearmotor unit 9, 10 and therefore the instantaneous angular position of the striker arm 11.

In variants (not shown) the system may comprise, in place of the sensor 14, another position sensor associated, for example, with the speed reducer 10 or the arm 11.

Figure 3:
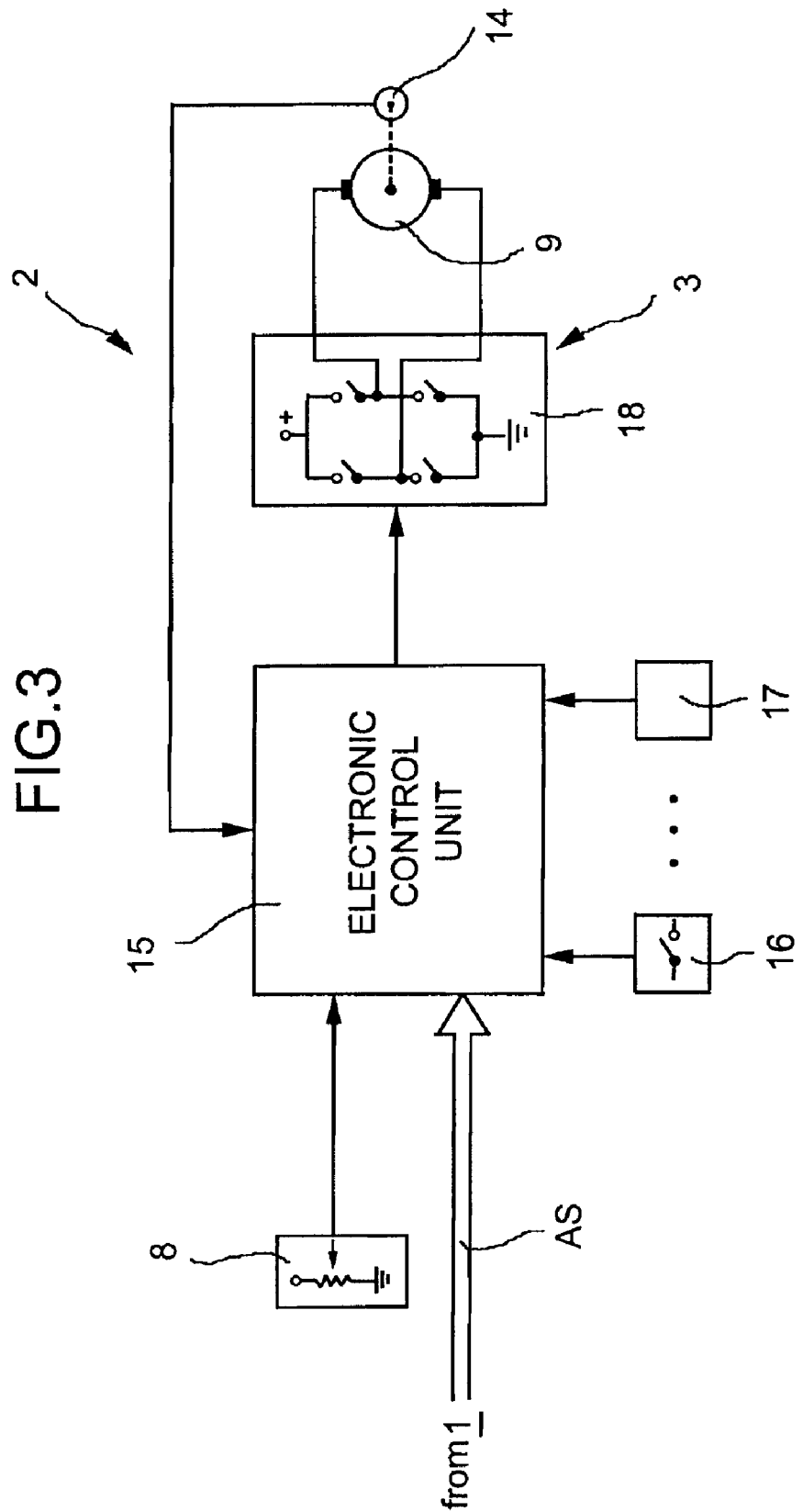
FIG. 3 is a more detailed block diagram of the system for controlling the retroactive force applied to the accelerator pedal in a signalling system according to the invention.

With reference to FIG. 3, the electromechanical assembly 3 comprises an electronic control unit 15 to which the warning signals and/or data AS generated by the electronic processing and control unit 1 described above are supplied during operation.

The position sensor 8 associated with the accelerator pedal P and the position sensor 14 associated with the gearmotor unit 9, 10 are connected to the electronic unit 15.

Moreover an enabling device 16, such as a manually operated switch for enabling/disabling the anti-collision alarm signalling system and (at least) one sensor 17 for the longitudinal speed of the motor vehicle, are conveniently connected to the unit 15.

The electronic unit 15 is designed to control the electric motor 9 by means of a driving circuit 18 which in the example of embodiment shown in FIG. 3 is essentially a switching circuit of the H-bridge type.

Conveniently, the electronic processing and control unit 1 is designed to detect collision danger situations and generate and send to the electronic unit 15 warning signals and/or data AS indicating a plurality of different danger levels or conditions. The electronic unit 15 is correspondingly designed to activate the electric motor 9 in a different manner, depending on the danger level or condition indicated by the signals or data AS supplied by the processing and control unit 1.

Thus, for example, a relatively low danger level may result in an activated condition of the electric motor 9 such that it, via the speed reducer 10, causes the arm 11 to engage with the lever 4 of the accelerator pedal P so as to increase in a continuous manner the resistance thereof to operation by the driver.

A relatively higher danger level may result in pulsed activation of the electric motor 9 so that the arm 11 applies to the lever 4 of the accelerator pedal P a series of force pulses having a predetermined frequency and intensity. With an increase in the danger level, the intensity of these force pulses may be varied for example.

At a third danger level activation of the motor 9 may be such as to cause, by means of the arm 11, the application to the pedal P of a high-frequency vibration, or pulses which have a frequency higher than those associated with the previous danger level, but an intensity which may be lower.

The electromechanical assembly 3 described above has the particular feature that it may be disconnected from the accelerator pedal P for as long as application of the alarm signal to this pedal is not required. The striker arm 11 is made to engage with the pedal P only when it is required to generate a haptic alarm signal.

Owing to the availability of the information relating to the instantaneous angular position of the pedal P and the instantaneous angular position of the striker arm 11, the system is able to generate the warning stress on the pedal in a more reliable and precise manner. Moreover, the system could also dispense with the position sensor 14, therefore operating in the form of an "open loop" as regards the position of the electromechanical actuator device.

The unit 15 is moreover designed to control the movement of the rotating member 11 based on a predefined mathematical model of the system comprising the accelerator pedal P and the mechanical part 9-11 of the electromechanical assembly 3.

Although in the description above and in the accompanying drawings, the electronic units 1 and 15 are shown as separate, it is evident that they may be incorporated into a processing and control unit designed to perform all the functions described above.

Obviously, without modifying the principle of the invention, the embodiments and the constructional details may be widely varied with respect to that described and shown purely by way of a non-limiting example, without thereby departing from the scope of the invention, as defined in the accompanying claims.

What is claimed is:

1. An alarm system for a motor vehicle provided with an accelerator pedal;
the system comprising:
  signalling means for providing the driver with a sensorial alarm signal indicating a danger situation;
  detector means for providing at least one of signals and data representing the situation outside the motor vehicle and/or the travel conditions of the vehicle itself; and
  electronic processing and control means for analyzing the at least one of signals and data provided by the detector means and determine the occurrence of predetermined operating situations, and generate, under predetermined conditions and in accordance with a predefined procedure, at least one of warning signals and data which can be used for activating the signalling means;
said signalling means comprising electrically operated actuators associated with the accelerator pedal of the motor vehicle for, when activated, applying to said pedal a stress with predefined characteristics, which is perceivable by the driver's foot,
wherein said electronic processing and control means generate at least one of warning signals and data indicating a plurality of different danger levels and operate said actuator means in a corresponding plurality of different modes, so as to apply to the accelerator pedal correspondingly different perceivable stresses,
said processing and control means driving the actuator means so as to cause the application, selectively, to the accelerator pedal of:
  a continuous resistive force tending to oppose the operating force exerted by the driver;
  a sequence of force pulses with a relatively low frequency and relatively high amplitude; and
  a sequence of force pulses with a relatively higher frequency and relatively lower amplitude; and
the system further comprising angular position sensor means associated with the accelerator pedal and the abovementioned rotating member, said sensor means being connected to said electronic processing and control means to control the movement of the rotating member based on a predefined mathematical model representing the system comprising the accelerator pedal and the mechanical part of said actuator means.

2. A system according to claim 1, in which one of the frequency and the amplitude of said force pulses is variable within a predetermined range.

3. A system according to claim 1, in which said actuator means comprise an electric motor coupled to a rotating member displaceable from a rest position, where it does not interfere with the movement of the accelerator pedal, into a working position, where it is able to apply to the accelerator pedal a force tending to oppose the operating force exerted by the driver.

4. A system according to claim 1, comprising sensor means able to provide a signal indicating the speed of travel of the motor vehicle, said electronic processing and control means enabling the operation of the actuator means only when the speed of travel of the motor vehicle is greater than a predetermined value.

* * * * *